Dec. 12, 1933.  F. C. HORTON  1,939,450
ICE CREAM CONE
Filed July 27, 1931
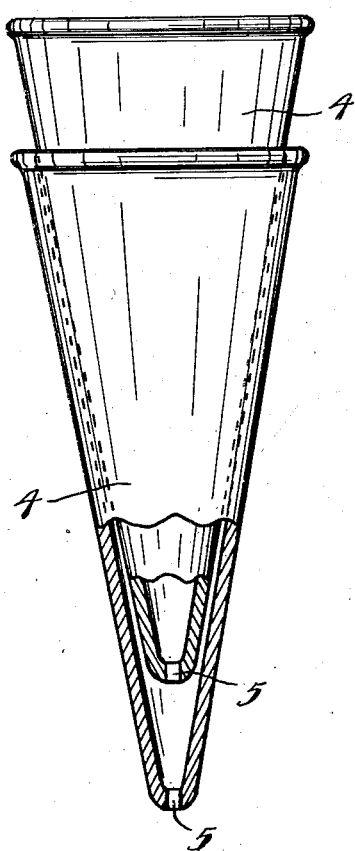
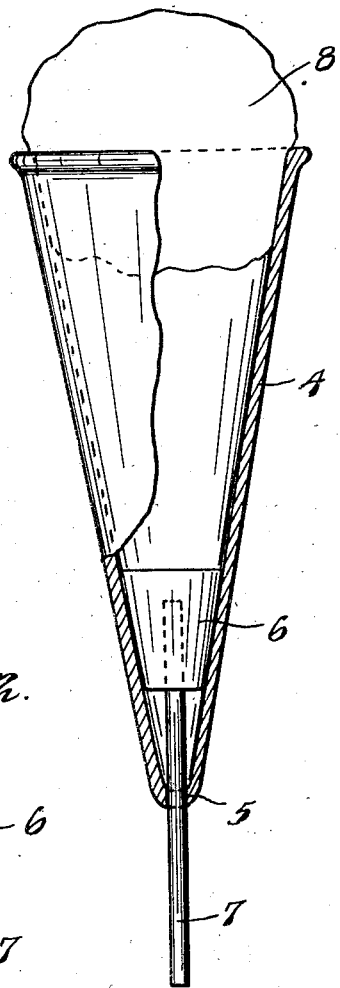
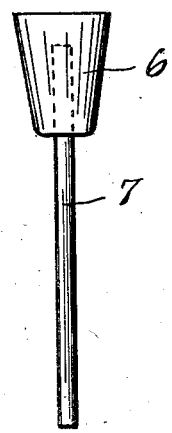
INVENTOR.
FRANK C. HORTON.
BY HIS ATTORNEYS.
Williamson & Williamson Patented Dec. 12, 1933

1,939,450

UNITED STATES PATENT OFFICE 1,939,450

ICE CREAM CONE

Frank C. Horton, Minneapolis, Minn.

Application July 27, 1931. Serial No. 553,253

1 Claim. (Cl. 99—16)

It is the object of this invention to provide a novel and improved ice cream cone and to this end generally stated, the invention consists in the novel parts and novel combinations of parts, defined in the appended claim and described in the following specification, made in connection with the accompanying drawing, wherein like notations refer to like parts throughout the several views, and in which, Fig. 1 is a view taken partly in side elevation and partly in vertical section through a pair of nested cones embodying the invention;

Fig. 2 is a view in side elevation illustrating an all day sucker adapted to be used with a cone, such as one of the cones shown in Fig. 1; and Fig. 3 is a view partly in side elevation and partly in vertical section illustrating one of the cones, such as shown in Fig. 1, filled with ice cream and having the all day sucker shown in Fig. 2, inserted in place therein.

Referring to the drawing, there is provided in accordance with the present invention an ice cream cone 4 formed of edible material and similar in all respects to a standard ice cream cone with the exception that the cone 4 has an opening 5 extending through its vertex. For use with the cone 4, an all day sucker is provided having a candy head 6 of truncated conical shape to fit the lower portion of the cone 4 and a stick 7 embedded in the candy head 6 and projecting downwardly therefrom below the smaller base of the head. The stick 7 may be made from wood, stick candy or any other desired material. Ice cream used for filling the cone 4 is designated by the numeral 8.

The cones 4 may be nested as shown in Fig. 1, packed, shipped and stored in the same manner that ordinary ice cream cones are nested, packed, shipped and stored. When an ice cream cone is to be dispensed by a store keeper, he will first insert one of the all day suckers within the cone by dropping the all day sucker, stick 7 downward, into the cone so that the stick 7 will run through the opening 5 in the vertex of the cone. The candy head 6 of the all day sucker will then form a plug filling the cone 4 adjacent the lower end of the same and the stick 7 may be used as a handle for holding the cone. The candy head 6 will either be made of a sticky material or it may be moistened slightly before it is inserted in the cone, so that it will become sticky to attach onto the walls of the cone as the all day sucker is dropped therein. After the all day sucker is placed within the cone, the upper end of the cone may be filled with ice cream 8 in the usual manner, whereupon the cone is ready to eat. The person eating the cone may grasp the portion of the stick 7 below the vertex of the cone to properly hold the cone and after the ice cream 8 and the upper portion of the cone 4 is eaten, the all day sucker will remain to be consumed. As the candy head 6 forms a plug for the cone, any of the ice cream 8 that melts and runs down into the interior of the cone will be restrained from running through the opening 5 by means of the plug formed by the head 6 of the all day sucker. If the stick 7 is made of wood or other non-edible material it may be thrown away after the candy head 6 has been eaten. If the stick 7 is made of candy or other edible material, it may be eaten along with the head 6.

It will, of course, be understood that various changes may be made in the form, details, arrangement and proportions of the article of confection without departure from the scope of the present invention.

What is claimed is:—

An article of confection comprising in combination, an ice cream cone having an opening at its vertex, a truncated conical candy head fitting within said cone above said opening engaging the side walls of the cone and sealing the same to prevent the flow of melted ice cream downwardly through said opening, and a stick embedded in said head and projecting downwardly through said opening in the cone to form a handle by which the confection can be held.

FRANK C. HORTON.